US011740533B2

(12) United States Patent
Poulin et al.

(10) Patent No.: US 11,740,533 B2
(45) Date of Patent: Aug. 29, 2023

(54) PROVIDING A DRIVE SIGNAL FOR OPTICAL MODULATOR PORTIONS

(71) Applicant: Ciena Corporation, Hanover, MD (US)

(72) Inventors: Michel Poulin, Quebec (CA); Alexandre Delisle-Simard, Quebec (CA); Michael Vitic, Chelsea (CA)

(73) Assignee: Ciena Corporation, Hanover, MD (US)

( * ) Notice: Subject to any disclaimer, the term of this patent is extended or adjusted under 35 U.S.C. 154(b) by 39 days.

(21) Appl. No.: 17/474,105

(22) Filed: Sep. 14, 2021

(65) Prior Publication Data

US 2023/0084020 A1    Mar. 16, 2023

(51) Int. Cl.
*G02F 1/225*    (2006.01)
*G02F 1/025*    (2006.01)

(52) U.S. Cl.
CPC .............. *G02F 1/2255* (2013.01); *G02F 1/025* (2013.01); *G02F 2201/127* (2013.01)

(58) Field of Classification Search
CPC ........... G02F 1/025; G02F 1/035; G02F 1/225; G02F 1/2255; G02F 1/2257; G02F 2201/127
USPC ........................................................ 385/1-3
See application file for complete search history.

(56) References Cited

U.S. PATENT DOCUMENTS 9,508,662 B2 * 11/2016 Kunishima et al. .... H01L 23/60
10,330,961 B2 * 6/2019 Latrasse et al. ....... G02F 1/025
10,823,988 B2   11/2020 Latrasse et al.

(Continued)

FOREIGN PATENT DOCUMENTS

WO    2022/225559 A1 * 10/2022 .................G02F 1/225

OTHER PUBLICATIONS

A. Samani et al., "Experimental parametric study of 128 Gb/s PAM-4 transmission system using a multi-electrode silicon photonic Mach Zehnder modulator", Opt.Express, Vol. 25, No. 12, Jun. 12, 2017.
A. Samani et al., "Silicon photonic Mach-Zehnder modulator architectures for on chip PAM-4 signal generationand transmission", J. Lightwave Technol., Vol. 37, No. 13, pp. 2989-2999, 2019.

(Continued)

*Primary Examiner* — Robert Tavlykaev
(74) *Attorney, Agent, or Firm* — Young Basile Hanlon & MacFarlane, P.C.

(57) ABSTRACT

A first transmission line comprises a first pair of electrodes receiving an electrical drive comprising first and second drive signals, which are loaded by a first series of p-n junctions applying optical phase modulation to respective optical waves propagating over a first section of the first and second optical waveguide arms of an MZI. A second transmission line comprises a second pair of electrodes configured to receive the electrical drive after an electrical signal delay. The second pair of electrodes are loaded by a second series of p-n junctions applying optical phase modulation to the respective optical waves propagating over a second section of the first and second optical waveguide arms after propagation over the first section. An electrode extension structure provides the electrical drive to the second pair of electrodes, and comprises an unloaded transmission line portion imposing the electrical signal delay based on an optical signal delay.

11 Claims, 10 Drawing Sheets

(56) References Cited

U.S. PATENT DOCUMENTS

| | | | | |
|---|---|---|---|---|
| 2004/0047529 | A1* | 3/2004 | Soda | G02F 1/3133 385/2 |
| 2006/0273395 | A1* | 12/2006 | Tanaka | H01L 21/8252 257/E27.012 |
| 2008/0069491 | A1* | 3/2008 | Kissa et al. | G02F 1/0123 385/2 |
| 2016/0085133 | A1* | 3/2016 | Denoyer | G02F 1/2257 385/3 |
| 2016/0291352 | A1* | 10/2016 | Kissa et al. | G02F 1/0102 |
| 2020/0012163 | A1* | 1/2020 | Yan et al. | G02F 1/2255 |
| 2020/0292908 | A1* | 9/2020 | Tsuzuki et al. | G02F 1/2257 |
| 2021/0080798 | A1* | 3/2021 | Kissa et al. | G02F 1/025 |
| 2022/0252910 | A1* | 8/2022 | Rakowski et al. | G02F 1/025 |
| 2022/0404680 | A1 | 12/2022 | Jacques et al. | |

OTHER PUBLICATIONS

A. Samani et al., "Silicon photonics modulator architectures for multi-level signal generation and transmission," 2017 Optical Fiber Communications Conference and Exhibition (OFC), 2017, pp. 1-3.

A. Samani, "Silicon Photonic Mach-Zehnder Modulator Architectures for High Order Modulation Formats," McGill University (Canada), ProQuest Dissertations Publishing, Dec. 2018.

A. Simard et al., "Segmented silicon MZM for PAM-8 transmissions at 114 Gbps with binary signaling", Opt.Express, Vol. 24, No. 17, 2016.

B. G. Lee et al., "Driver-Integrated 56-Gb/s Segmented Electrode Silicon Mach Zehnder Modulator Using Optical-Domain Equalization," in Optical Fiber Communication Conference, OSA Technical Digest (online), Optical Society of America, 2017.

D. Patel et al., "Silicon photonic segmented modulator based electro-optic DAC for 100 Gbps PAM-4generation", IEEE Photon. Technol. Lett., Vol. 27, No. 23, pp. 2433-2436, 2015.

E. Temporiti et al., "A 56Gb/s 300mW Silicon-Photonics Transmitter in 3D-Integrated PIC25G and 55nm BiCMOS Technologies", Proceedings ISSCC, pp. 404-406, 2016.

M. Jacques et al., "Silicon Photonic MZM Architectures for 200G per Lambda IM/DD Transmission", OFC Technical Conference Jun. 11, 2021 Early Posting conference paper (available only to registered attendees).

T. N. Huynh et al., "Flexible Transmitter Employing Silicon-Segmented Mach-Zehnder Modulator With 32-nm CMOS Distributed Driver," in Journal of Lightwave Technology, vol. 34, No. 22, pp. 5129-5136, Nov. 15, 2016, doi: 10.1109/JLT.2016.2606558.

* cited by examiner

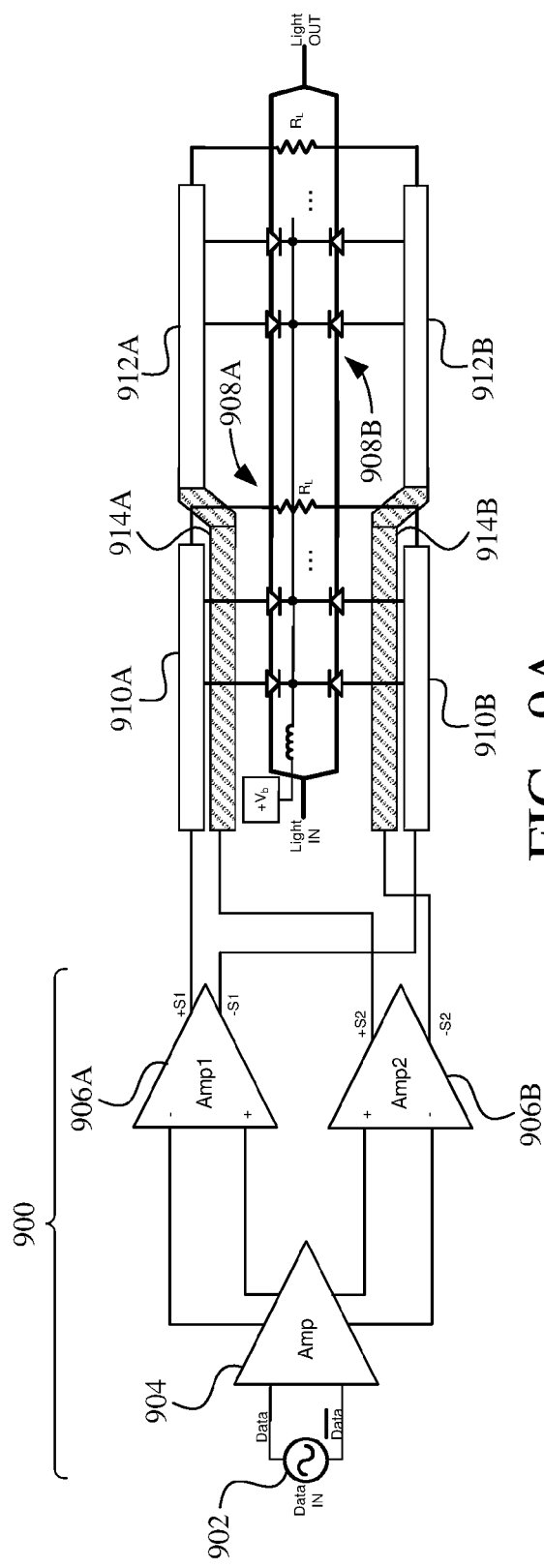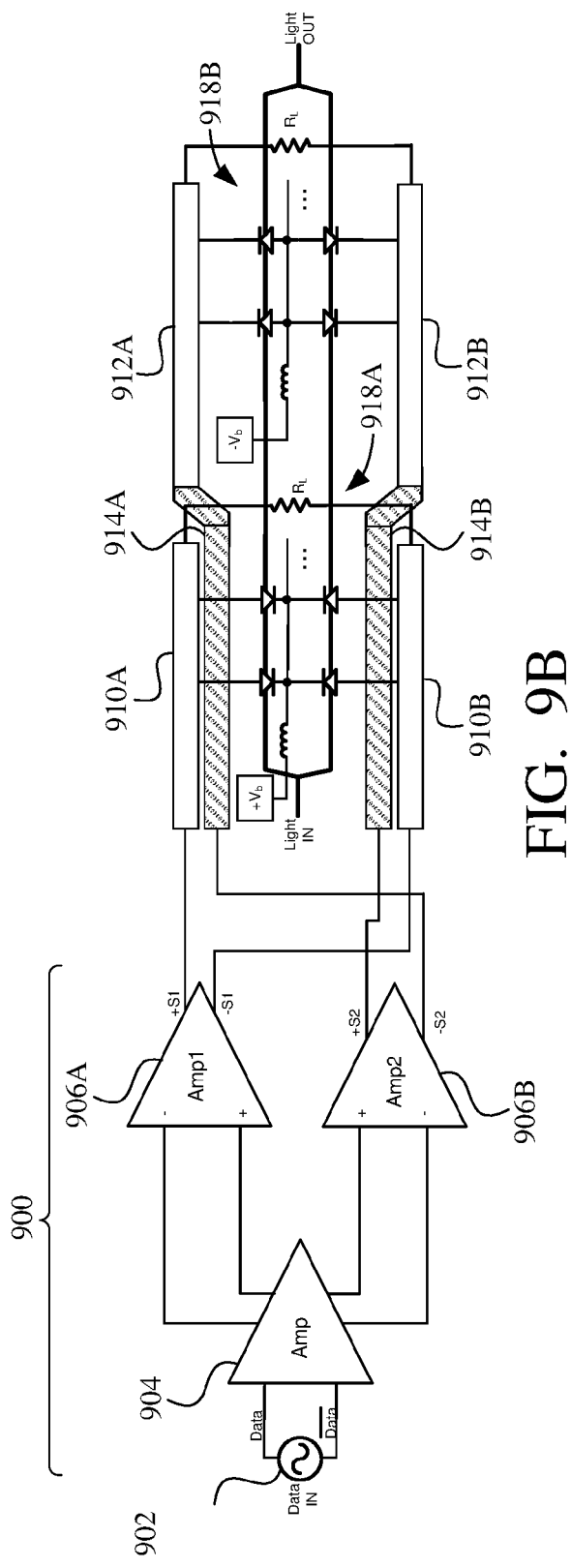
FIG. 9A
FIG. 9B

PROVIDING A DRIVE SIGNAL FOR OPTICAL MODULATOR PORTIONS

TECHNICAL FIELD

This disclosure relates to providing a drive signal for optical modulator portions.

BACKGROUND

A modulator is generally used to modulate a provided carrier wave with data to provide a modulated data signal. For example, an optical wave can be modulated using an optical modulator in an optical communication system. One type of optical modulator uses a Mach-Zehnder interferometer (MZI) to modulate the amplitude (and phase) of an optical wave that is split at an input over two arms (e.g., waveguides) of the MZI and combined with respective phase shifts at an output, which is also known as a Mach-Zehnder modulator (MZM). Some MZMs are travelling-wave MZMs (TW-MZMs), which apply phase shifts over the arms using an electrical wave that propagates over a transmission line to apply the phase shifts. An example of a device that can use electrical fields (static or traveling-wave) to modulate a refractive index in, or in proximity to, the waveguide arms of an MZM is a device that includes p-n junctions within the modulator structure. Various challenges may be encountered when attempting to operate such MZMs at relatively high frequencies while limiting associated losses.

SUMMARY

In one aspect, in general, an integrated circuit comprises: an optical waveguide structure forming a Mach-Zehnder interferometer that includes a first optical waveguide arm and a second optical waveguide arm; a first electrical input port configured to receive a first drive signal; a second electrical input port configured to receive a second drive signal; a first transmission line comprising a first pair of electrodes configured to receive an electrical drive comprising the first drive signal and the second drive signal, where the first pair of electrodes are loaded by a first series of p-n junctions configured to apply optical phase modulation to respective optical waves propagating over a first section of the first and second optical waveguide arms; and a second transmission line comprising a second pair of electrodes configured to receive the electrical drive after an electrical signal delay, where the second pair of electrodes are loaded by a second series of p-n junctions configured to apply optical phase modulation to the respective optical waves propagating over a second section of the first and second optical waveguide arms after propagation over the first section of the first and second optical waveguide arms, and an electrode extension structure configured to provide the electrical drive to the second pair of electrodes, where the electrode extension structure comprises an unloaded transmission line portion that is not loaded by any p-n junctions and that is configured to impose the electrical signal delay onto the electrical drive that is based on an optical signal delay imposed onto the respective optical waves before entering the second section of the first and second optical waveguide arms.

Aspects can include one or more of the following features.

The integrated circuit further comprises driver circuitry that provides the first drive signal to the first electrical input port and provides the second drive signal to the second electrical input port.

The driver circuitry comprises signal splitting circuitry coupled to a differential signal output port of an electrical circuit.

The driver circuitry comprises transistor-level circuitry within an electrical circuit that includes two pairs of differential signal output ports.

The integrated circuit further comprises a first junction among three wires that include a first wire connected to the first electrical input port, a second wire connected to a first electrode of the first pair of electrodes, and a third wire connected to a first electrode of the electrode extension structure, and a second junction among three wires that include a fourth wire connected to the second electrical input port, a fifth wire connected to a second electrode of the first pair of electrodes, and a third wire connected to a second electrode of the electrode extension structure.

At least a portion of the unloaded transmission line portion is in a different layer of the integrated circuit than the first pair of electrodes.

The first series of p-n junctions and the second series of p-n junctions are of substantially equal lengths.

The electrical drive comprises a differential electrical drive where the second drive signal has a negative amplitude relative to the first drive signal, and the optical phase modulation comprises a differential optical phase modulation between the first and second optical waveguide arms.

The electrode extension structure is configured to impose the electrical signal delay onto the differential electrical drive that is substantially equal to the optical signal delay imposed onto the respective optical waves before entering the second section of the first and second optical waveguide arms.

In another aspect, in general, an apparatus comprises: an integrated circuit comprising an optical waveguide structure forming a Mach-Zehnder interferometer that includes a first optical waveguide arm and a second optical waveguide arm, a first electrical input port configured to receive a first drive signal, a second electrical input port configured to receive a second drive signal, a first transmission line comprising a first pair of electrodes on a first electrode layer configured to receive an electrical drive comprising the first drive signal and the second drive signal, where the first pair of electrodes are loaded by a first series of p-n junctions configured to apply optical phase modulation to respective optical waves propagating over a first section of the first and second optical waveguide arms, and a second transmission line comprising a second pair of electrodes on the first electrode layer configured to receive the electrical drive after an electrical signal delay, where the second pair of electrodes are loaded by a second series of p-n junctions configured to apply optical phase modulation to the respective optical waves propagating over a second section of the first and second optical waveguide arms after propagation over the first section of the first and second optical waveguide arms; and an electrode extension structure configured to provide the electrical drive to the second pair of electrodes, where the electrode extension structure includes a transmission line portion that is above or below the first electrode layer.

Aspects can include one or more of the following features.

The transmission line portion is in a layer of the integrated circuit different from the first electrode layer.

The transmission line portion is in a device that is coupled to the integrated circuit by a controlled collapse chip connection.

The integrated circuit includes driver circuitry configured to provide the first and second drive signals.

The integrated circuit is a first integrated circuit, and the first integrated circuit is coupled to a second integrated circuit that includes driver circuitry configured to provide the first and second drive signals.

The driver circuitry comprises signal splitting circuitry coupled to a differential signal output port of an electrical circuit.

The driver circuitry comprises transistor-level circuitry within an electrical circuit that includes two pairs of differential signal output ports.

In another aspect, in general, an integrated circuit comprises: an electrical driver circuit; an optical waveguide structure forming a Mach-Zehnder interferometer that includes a first optical waveguide arm and a second optical waveguide arm; and a plurality of transmission lines, each transmission line comprising a pair of electrodes configured to receive an electrical drive comprising a first drive signal and a second drive signal, where each pair of electrodes is loaded by a different series of p-n junctions configured to apply optical phase modulation to respective optical waves propagating over a corresponding section of the first and second optical waveguide arms; where a total number of the sections of the first and second optical waveguide arms is more than one and fewer than four; and where each electrical drive received by each pair of electrodes is derived from the electrical driver circuit.

Aspects can include one or more of the following features.

The driver circuit includes a first amplifier circuit that provides a first electrical drive to a first pair of electrodes of a first of the transmission lines, and a second amplifier circuit that provides a second electrical drive to a second pair of electrodes of a second of the transmission lines.

The different series of p-n junctions of each corresponding section are of substantially equal lengths.

The electrical drive comprises a differential electrical drive where the second drive signal has a negative amplitude relative to the first drive signal, and the optical phase modulation comprises a differential optical phase modulation between the first and second optical waveguide arms.

Aspects can have one or more of the following advantages.

An MZI-based modulator can use different transmission lines for providing high-frequency electronic drive signals (e.g., radio-frequency (RF) signals) to different respective sections of a pair of waveguide arms of the MZI for modulating optical signals propagating within those waveguide arms. For example, the transmission lines can each be provided as a different coplanar-strip (CPS) electrode, with a first CPS electrode configured to bring the drive signal to the input of the modulator, with the first CPS electrode enabling phase modulation over a first portion of the modulator that phase shifts a first section of the waveguide arms. After propagation over the first half of the modulator, the drive signal would be attenuated. A second CPS electrode is configured to provide a less-attenuated drive signal at the start of a second portion of the modulator, with the second CPS electrode enabling phase modulation over a second portion of the modulator that phase shifts a second section of the waveguide arms. The drive signal sent to both the first and second CPS electrodes is coming from the same driver. For example, drive signal circuitry can be configured to use parallel feed after the output of the driver, or can be configured to provide different copies of a differential drive signal at different output ports after split and amplification within the same driver. For example, bringing a "fresh" drive signal at a second portion of the modulator that starts at the midpoint of the modulator enables a significantly increased modulation bandwidth, as each modulated section of the modulator is now half the total length of the modulator.

This approach may be well suited for voltage source-type drivers such as Emitter Follower (EF) (single, double, n) drivers, or Emitter Follower Push-Pull (EF-PP) (single, double, n) drivers, which have shown good performance even with low impedance loading. This approach can also be applied to other driver architectures, such as open collector drivers, with some power consumption trade-offs. The bandwidth of a series-push-pull travelling-wave modulator can be increased significantly without significantly increasing any of: the modulator's half wave voltage $V_\pi$ (corresponding to a phase change of $\pi$), optical losses, or the overall power consumption of the driver. The techniques are also applicable to other type of travelling-wave modulators, and to any of a variety of material platforms including silicon photonics (SiP) platforms.

In some implementations, the differential drive signals are designed to operate at high frequencies (e.g., greater than 40 GHz, such as around 100 GHz or higher). For example, a "push-pull" differential signal includes two signals that are complementary to each other: a first signal S (also called the S complement, or simply S) and second signal $\overline{S}$ (also called the $\overline{S}$ complement, or simply $\overline{S}$), which has a negative amplitude relative to S, such that the relationship $S = -\overline{S}$ is at least approximately maintained during operation of the modulator. So, the sign of the amplitude of S is the opposite of the sign of the amplitude of $\overline{S}$, and the magnitude (i.e., absolute value) of the amplitude of S is substantially equal to the magnitude of the amplitude of $\overline{S}$. Given the symmetry between the complementary signals, the designation of which one is labeled as S, and which one is labeled as $\overline{S}$, can be interchanged in any of the examples described and illustrated herein. These differential drive signals generally enable better signal integrity and reduced power consumption compared to modulators that are controlled by a single-ended driver, especially for high-frequency operation.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 9A-9C are schematic diagrams of example driver circuits connected to modulators.

DETAILED DESCRIPTION

The bandwidth of a travelling-wave modulator making use of p-n junctions in depletion mode (i.e., used with reverse bias voltage) for modulating the phases of the guided optical waves based on the resulting change in the effective index of refraction of the pn-junctions caused by an electronic drive signal depends mainly on two factors. One factor determining the bandwidth is the intrinsic loss of the transmission line delivering the drive signal from the driver along the transmission line. This intrinsic loss is the loss of the transmission line without any loading from the p-n junctions, and is mainly determined by the sheet resistance of the metal used, and by the loss of the material surrounding the transmission line. To give an order of magnitude, this loss can be around 2 dB/cm, for example. In some examples described herein the transmission line is implemented as a CPS electrode, where the CPS electrode includes two metal strips each having width W and separation distance D between the metal strips. Another factor determining the bandwidth is the amount of drive signal that is lost by the Joule effect in the resistance of the p-n junctions that are loading the transmission line. In the case of the Series Push-Pull modulator using a CPS electrode as the transmission line, two p-n junctions in series are connected between the two metal strips of the CPS electrode. The access resistance, between the CPS electrode strips and each p-n junction, and between the two p-n junctions themselves, contributes to a large portion of the total loss, with a contribution typically around 15 dB/cm at 30 GHz (to give an order of magnitude).

Figure 1:
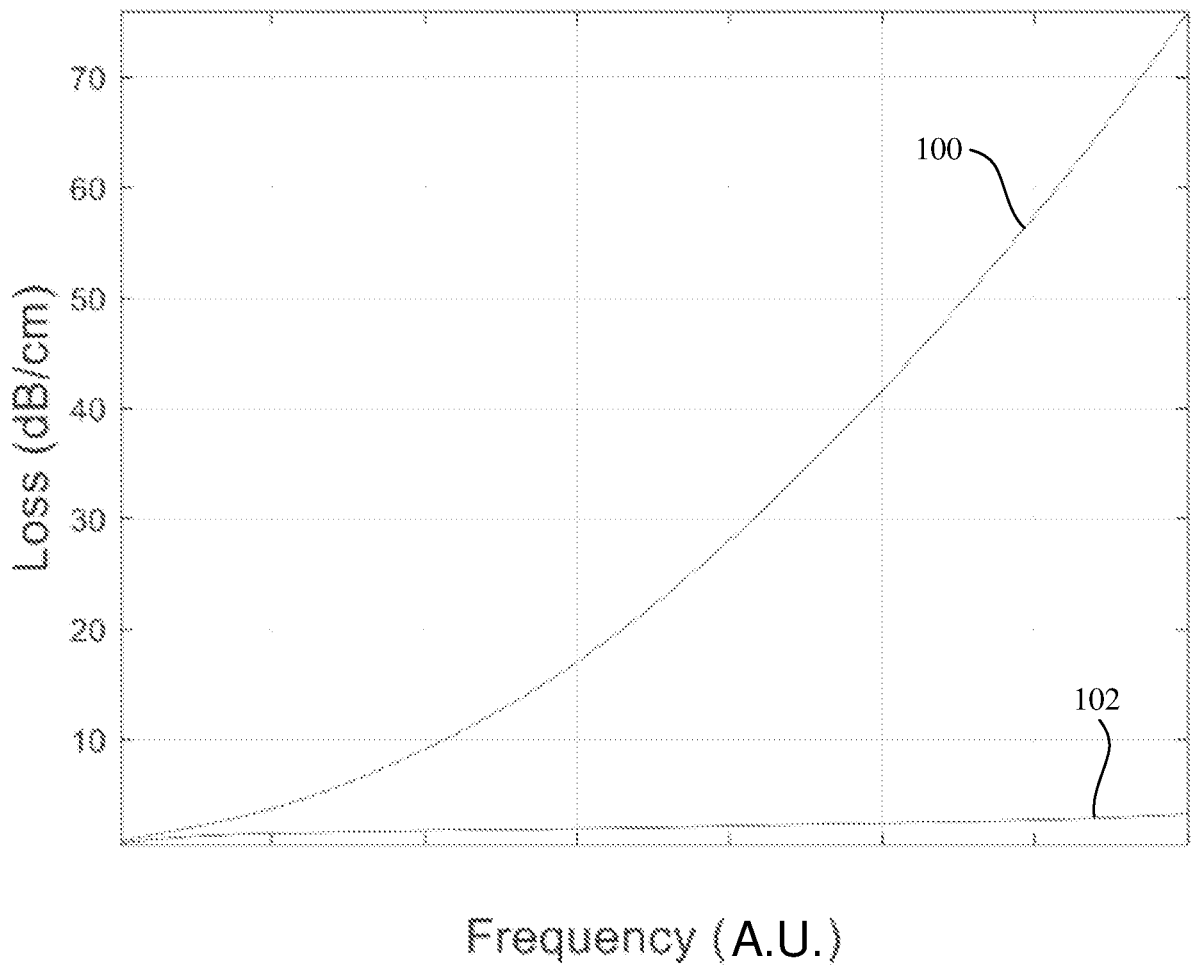
FIG. 1 is a plot of a prophetic example of loss associated with transmission lines.

FIG. 1 shows a prophetic example of loss of a travelling-wave CPS electrode used as an unloaded transmission line 100, and used as a loaded transmission line 102 that has p-n junction pairs between the electrode strips, plotted as loss in dB/cm as a function of frequency in arbitrary units (A.U.). The frequency dependent RF losses shown in FIG. 1 illustrate that the dominant loss contribution comes from the access resistance of the p-n junctions rather than the intrinsic loss of the CPS electrode on its own. Thus, the strength of the drive signal will decrease rapidly at high frequency as the modulator is made longer. Although a long modulator will generally be more efficient (i.e., lower $V_\pi$), it will have a smaller electro-optic (EO) bandwidth determined based on an EO response curve for the modulator.

Figure 2:
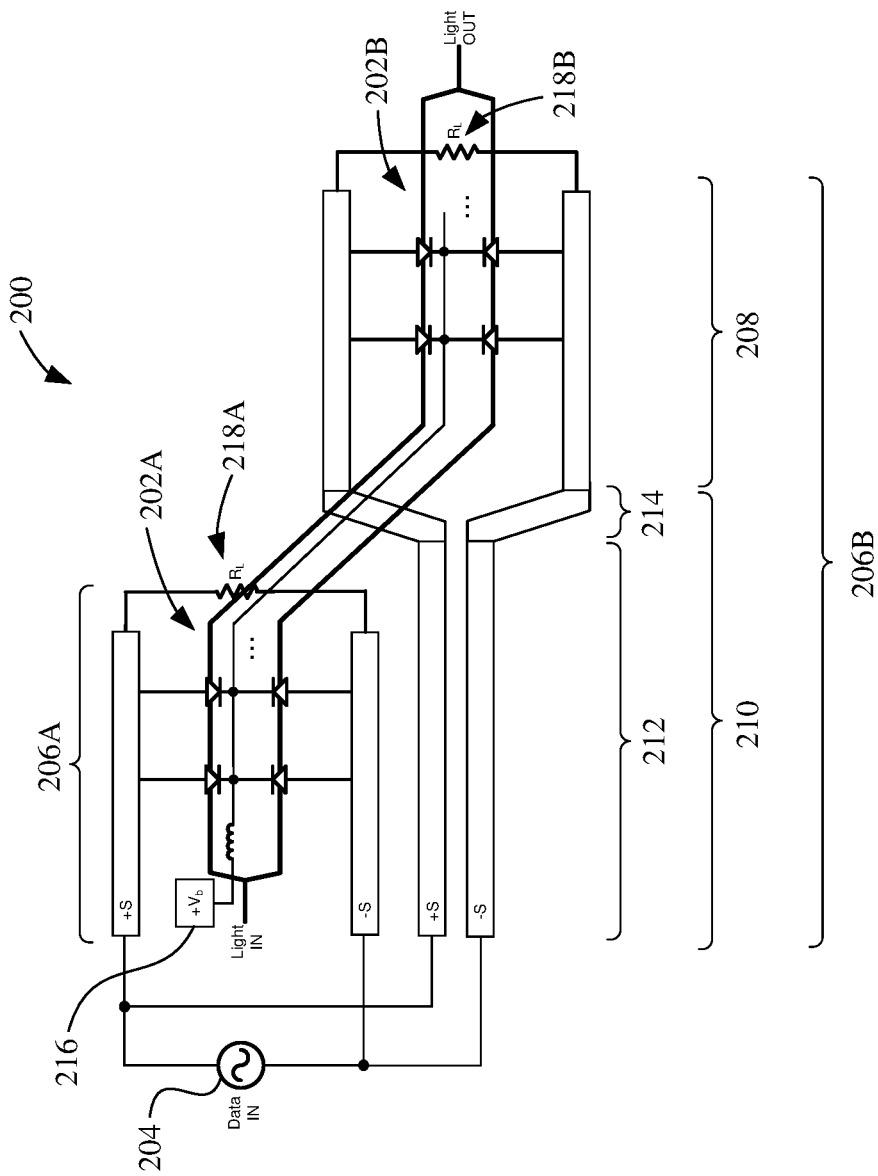
FIG. 2 is a schematic diagram of an example modulator.

Referring to FIG. 2, an example of a modulator 200 includes an MZI with two sections 202A and 202B, and a driver 204 that can be fabricated on the same integrated circuit in some implementations to provide a high-frequency (e.g., RF) drive signal. The differential output of the driver 204 is connected by wires (e.g., metal traces) to two transmission lines 206A and 206B, which in this example are implemented by CPS electrodes, each comprising a pair of electrode strips. The driver 204 provides a signal S for connection to one of the electrode strips and a complement signal $\overline{S}$ for connection to the other of the electrode strips. The transmission line 206A is loaded with a series of p-n junction pairs used to modulate the phases in the optical waveguide arms of the MZI section 202A corresponding to the first half of the modulator 200, and the transmission line 206B is loaded with a series of p-n junction pairs used to modulate the phases in the optical waveguide arms of the MZI section 202B corresponding to the second half of the modulator 200. The transmission line 206B includes a pair of electrode strips 208 that are loaded with the p-n junction pairs, and an electrode extension structure 210 consisting of an unloaded pair of parallel electrode strips 212 and an unloaded pair of expanding electrode strips 214 connecting the unloaded electrode strips 212 to the loaded electrode strips 208. While travelling over the electrode extension structure 210, the drive signal suffers relatively low loss, as the electrode strips 212 and 214 are not loaded with p-n junctions. As such, the drive signal arrives at the start of the loaded electrodes strips 208 with its full original amplitude, ready to modulate the second half of the modulator 200, similarly to the first half of the modulator 200. Other circuitry can be included to provide appropriate biasing and termination, such as a bias voltage source 216 connected with appropriate inductance to the series of p-n junction pairs overlapping the optical waveguide arms of the MZI section 202A and the series of p-n junction pairs overlapping the optical waveguide arms of the MZI section 202B, and terminating load resistors 218A and 218B terminating the transmission lines 206A and 206B, respectively.

Figure 3:
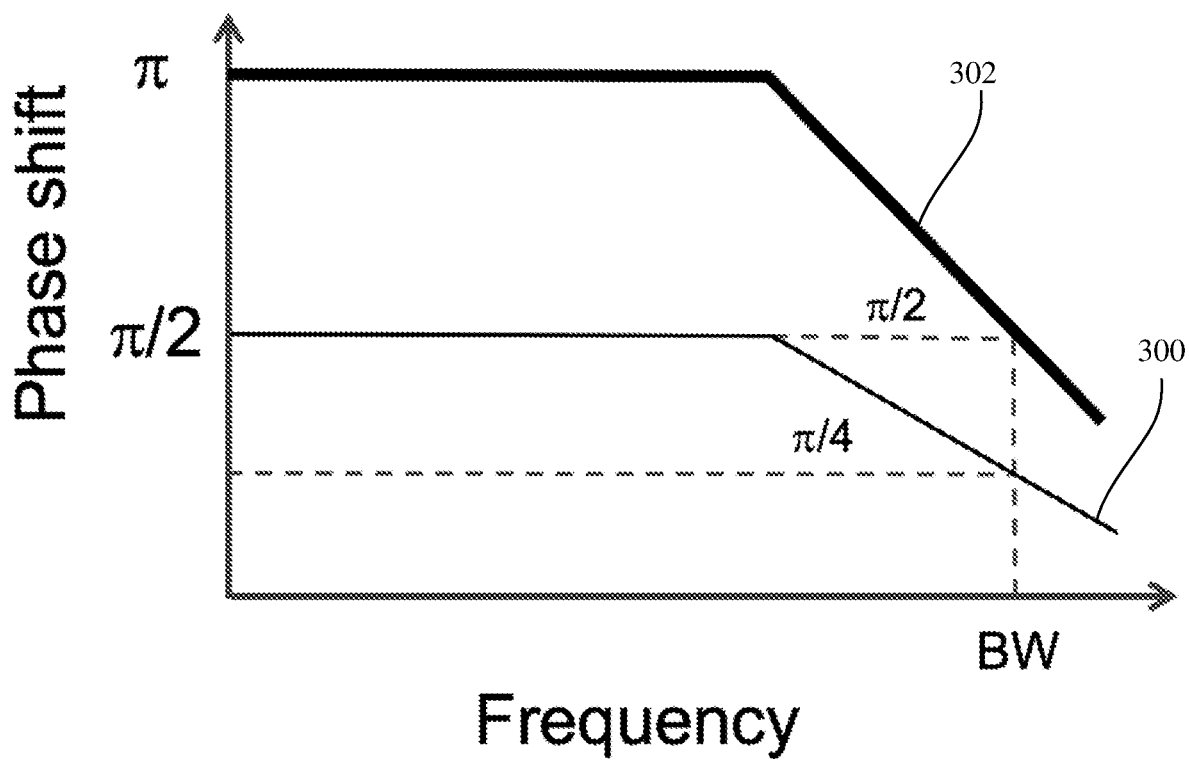
FIG. 3 is a plot of a prophetic example of phase shift over an operating bandwidth.

FIG. 3 shows a prophetic example of phase shift accumulated in a single section of length L/2 (curve 300), and after two sections of length L/2 (curve 302), over frequency. With two identical sections, the phase shift doubles but the normalized frequency response (not shown) and bandwidth (BW) remain the same as that of the single section. This example illustrates that phase modulation in cascaded phase shifters is an additive process. Cascading two identical phase shifters (e.g., the two halves of the modulator 200 corresponding to the two MZI sections 202A and 202B, each of length L/2) in the light path doubles the accumulated phase shift. The modulation bandwidth of this cascaded "dual-drive modulator" is then the same as that of a modulator with a single MZI section of length L/2 (i.e., the EO response of the cascade is not the product of the two individual EO transfer functions). Compared to a single section modulator of the same total length L (the equivalent "single-drive modulator"), the bandwidth of the dual-drive modulator will thus be improved when the voltage is refreshed by sending a different (and delayed) copy of the drive signal to the second section, instead of continuing the attenuated drive signal through the second half as in the single-drive modulator.

Figure 4:
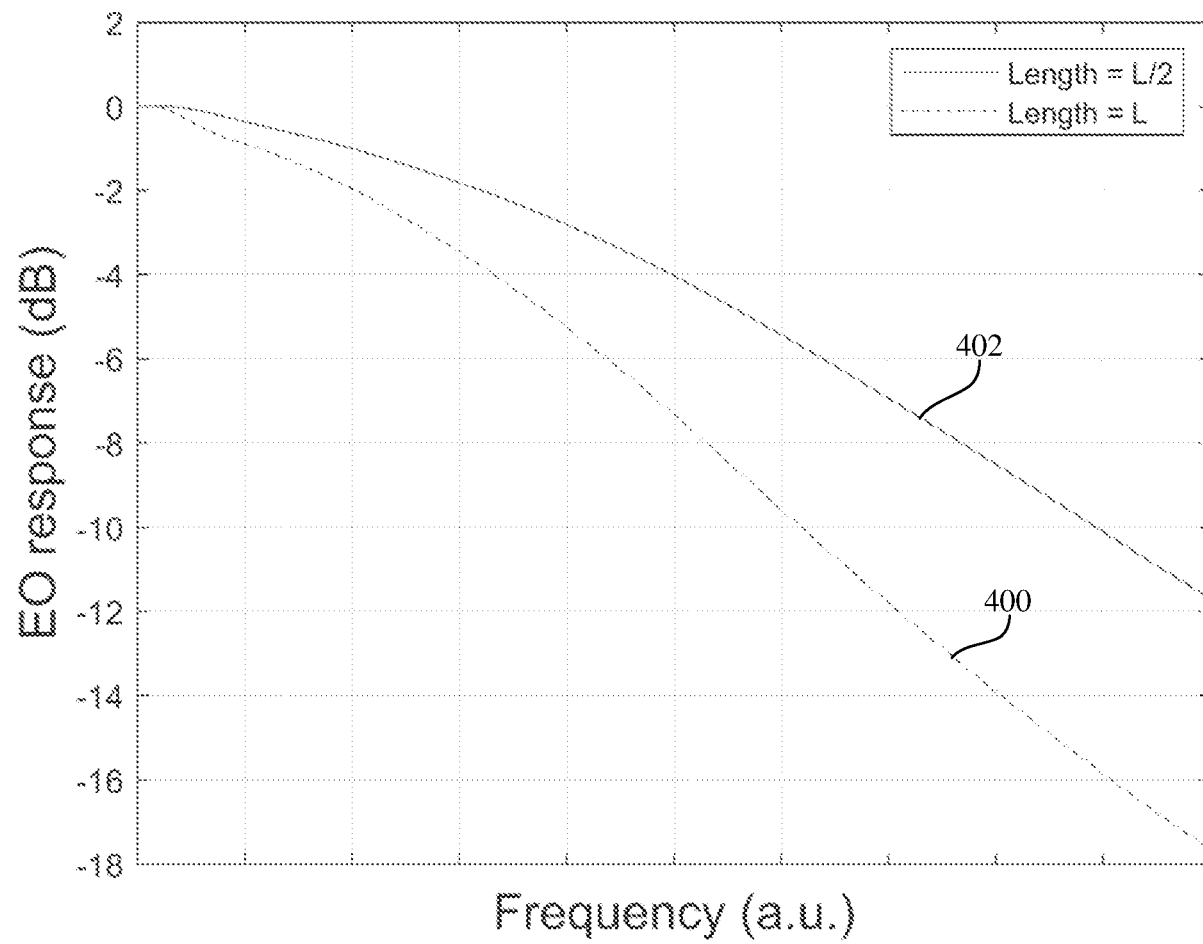
FIG. 4 is a plot of a prophetic example of an electro-optic frequency response.

Both halves of the dual-drive modulator being driven similarly and the phase modulation in each MZI section being accumulative, the full phase modulation amplitude of the single-drive modulator is retained (with the same $V_\pi$, but the bandwidth of the dual-drive modulator is substantially increased, as the frequency response now is that of a modulator twice shorter. FIG. 4 gives a prophetic example of an electro-optic frequency response 400 of a single-drive modulator of length L compared to an electro-optic frequency response 402 of a modulator twice shorter (of length L/2, equivalent to a dual-drive modulator). We can see that the shorter modulator, and thus the dual-drive modulator, has a significantly larger bandwidth than the single-drive modulator.

Referring back to FIG. 2, the geometry of the unloaded electrode extension structure 210, can be configured to provide a similar impedance as the loaded electrode strips 208. For example, the two electrode strips 212 can be brought closer together (as shown in FIG. 2) to increase the capacitance of that portion of the transmission line 206B, leading to increased impedance as $$Z = \sqrt{\frac{L}{C}}$$

. The length of the electrode extension structure 210 can also be configured such that the RF wave carrying the drive signal travels the proper time over the electrode strips 212 and 214 in order to match the time delay associated with the RF group index of the loaded transmission line 206A before modulating the p-n junctions between the electrode strips 208 in the loaded portion of the transmission line 206B. This phase-matching can be configured so that the phase modulation generated in the second half aligns and adds up to the phase modulation generated in the first half. If necessary, the optical and/or RF paths can be configured for this purpose, without necessarily requiring any use of an active delay element in some passive implementations. In this example, the driver 204 will then see as a load an input impedance of approximately half of the input impedance of a single transmission line as there are two transmission lines 206A and 206B with approximately equal input impedances in parallel.

Alternatively, in some implementations, instead of using the same input impedance for the second transmission line 206B as the first transmission line 206A, the modulator could be configured to use a larger gap (D) between the two electrode strips 212 to decrease the capacitance in the first portion of the electrode extension structure 210 and thereby increase the transmission line input impedance. Alternatively, the two electrode strips 212 could use a smaller width (W) to increase inductance for the same purpose. The parallel combination of both transmission lines 206A and 206B would then offer a larger input impedance as a load to the driver 204, and help the driver deliver a larger voltage swing. However, this would lead to an impedance mismatch between the unloaded electrode extension structure 210 and the loaded electrode strips 208 of the second transmission line 206B. This can be mitigated by designing the expanding electrode strips 214 to have an adiabatic transition between the CPS electrode geometries of the electrode strips 212 and the electrode strips 208. In some cases, a more abrupt transition over the expanding electrode strips 214 may be better suited than an adiabatic transition. In all cases, the time delay undergone in the unloaded electrode transition structure 210 can be configured to match the time required for the light to travel over the MZI section 202A of the first half of the modulator 200.

Return loss, or impedance mismatch between the unloaded line and loaded line, can contribute to pass band ripple. By way of example only, without being bound by theory, a transmission coefficient of an S-parameter matrix can be represented as $$S_{21} = \sqrt{1 - S_{11} - losses}$$

where $S_{11}$ is a reflection coefficient of the S-parameter matrix, and '1' refers to the conservation of energy (not voltage) the energy in the wave being $V^2=1$. When the length of the mismatched unloaded line is much less than around ¼λ, the reflections from front and back (e.g., source and terminations) are 180 degrees out of phase, in which case there is no net reflection, and all transmitted waves are in phase and add, i.e. $S_{11}$ is large an negative, and $S_{21}$ is nearly 0. When the length of the mismatched unloaded line is $$\left(\frac{1}{2} \times n + \frac{1}{4}\right)\lambda,$$

the reflected waves from front and back add, resulting in maximum reflected signal and the transmitted waves are out-of-phase and $S_{21}$ is at a minimum. Conversely, when the length of the mismatched unloaded line is $$n \times \frac{1}{2}\lambda,$$

the reflected waves from front and back subtract, resulting in minimum reflected signal and the transmitted waves are in phase and $S_{21}$ is at a maximum. Generally, as the frequency increases, insertion loss increases and return loss decreases. Longer distance between reflections leads to smaller frequency range between high and low values. Generally, the larger the impedance difference, the larger the modulation on the transfer function. The voltage delivered into the loaded line after the unloaded line can be expressed as $$V_o^+ = V_s \frac{Z_0}{Z_0 + Z_s} \frac{e^{-j\beta\ell}}{\left(1 - \Gamma_\ell \Gamma_s e^{-2j\beta\ell}\right)},$$

where $V_s$ is the source voltage, $Z_0$ is the characteristic impedance of the loaded line MZM, $Z_S$ is the source impedance of the EF or EF-PP driver, $\Gamma_\ell$ is the reflection coefficient of the unloaded line, $\Gamma_s$ is the reflection coefficient of the source, $$\beta = \omega\sqrt{\mu\varepsilon}$$

is the propagation constant, and $\ell$ is the length of the mismatched unloaded line. Abrupt or adiabatic transitions between the unloaded line and loaded line balance real-estate for desired return loss. Both types of transitions are applicable for different implementations, however abrupt may be preferred in some implementations since it is more compact and may provide a broader bandwidth. There may be need for careful balance between the allowable ripple (e.g., dictated by system requirements) and maintaining a high impedance for the unloaded CPS and loaded CPS based on the voltage delivered into the load with a voltage source with finite source resistance.

A modulator with two or more sections will be referred to, generally, as a "multi-drive modulator." As mentioned before, an EF or EF-PP (Emitter Follower Push-Pull) will have a finite source 'non-zero' impedance, therefore as the impedance of the modulator is reduced, the delivered voltage from the source will also be diminished. Layout can be an issue for some implementations; for example, some applications are space constrained, and therefore drivers and modulators may employ a fixed channel pitch, trading off crosstalk between neighboring channels and space. The more sections there are, the more 'width'/'area' a given channel occupies leading to a larger channel pitch or occupying more layers of a high density build up substrate. The advantages associated with more than 2 or 3 sections may be diminished since trade-offs are made for crosstalk and cost (e.g., more build up layers).

Figure 5:
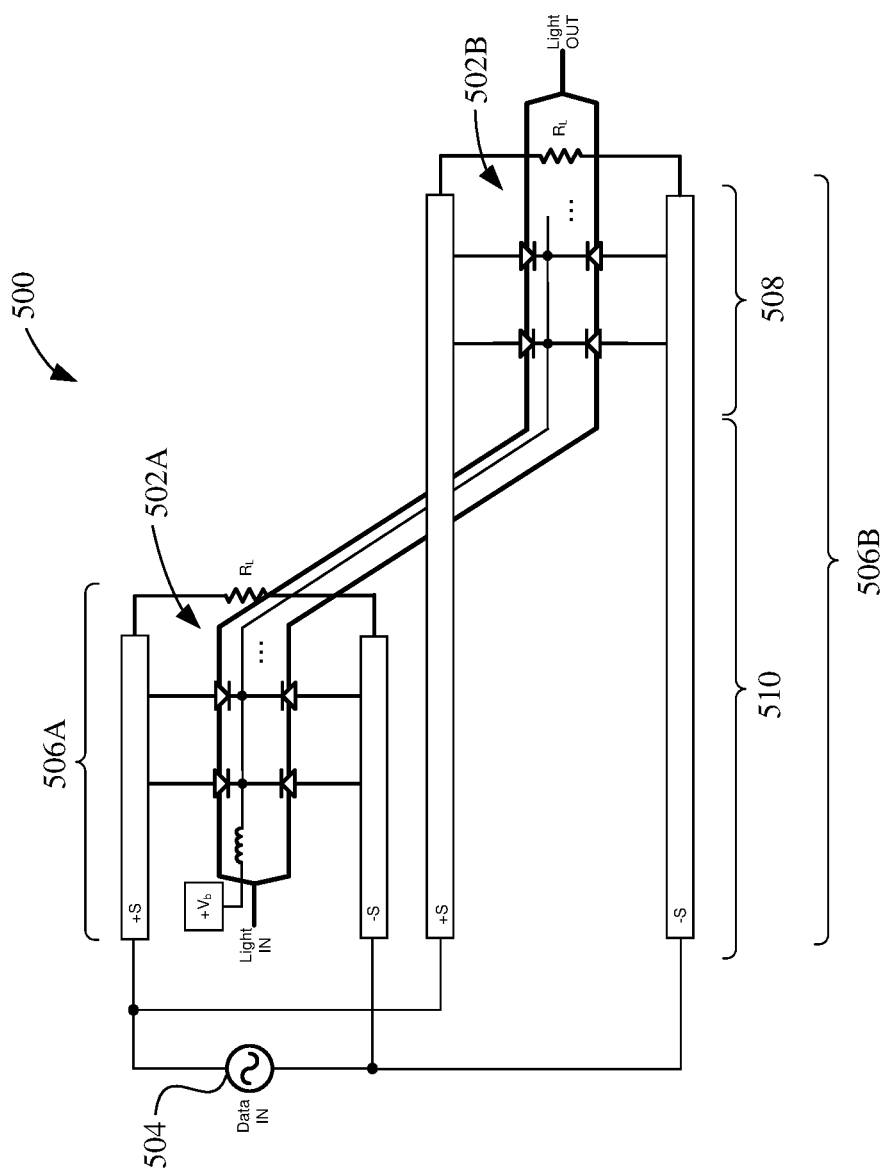
FIG. 5 a schematic diagram of an example modulator.

One example of an alternative implementation of a multi-drive modulator is shown in FIG. 5. In this example, a modulator 500 includes an MZI with two sections 502A and 502B, and a driver 504. The differential output of the driver 504 is connected by wires to two transmission lines 506A and 506B, which in this example are implemented by CPS electrodes, each comprising a pair of electrode strips. The transmission line 506A is loaded with a series of p-n junction pairs used to modulate the phases in the optical waveguide arms of the MZI section 502A corresponding to the first half of the modulator 500, and the transmission line 506B is loaded with a series of p-n junction pairs used to modulate the phases in the optical waveguide arms of the MZI section 502B corresponding to the second half of the modulator 200. The transmission line 506B includes a pair of electrode strips 508 that are loaded with the p-n junction pairs, and an electrode extension structure 510 consisting of an unloaded pair of parallel electrode strips having the same separation distance as the loaded electrode strips 508.

Figure 6A:
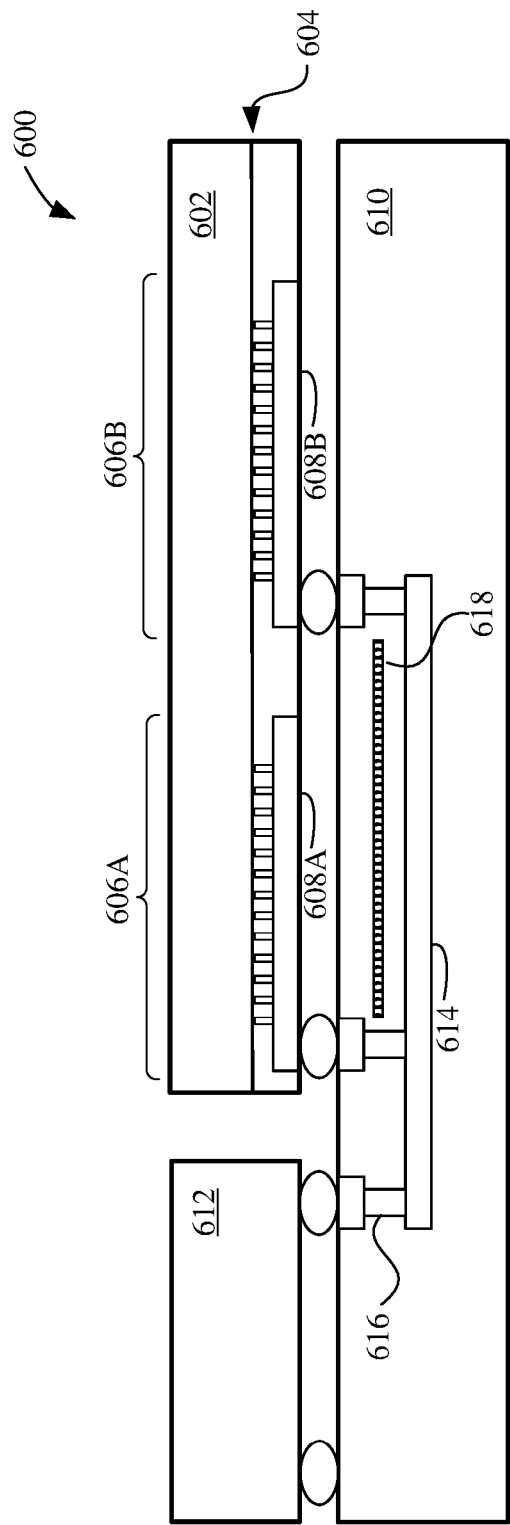
FIGS. 6A and 6B are schematic diagrams of example modulators.
Figure 6B:
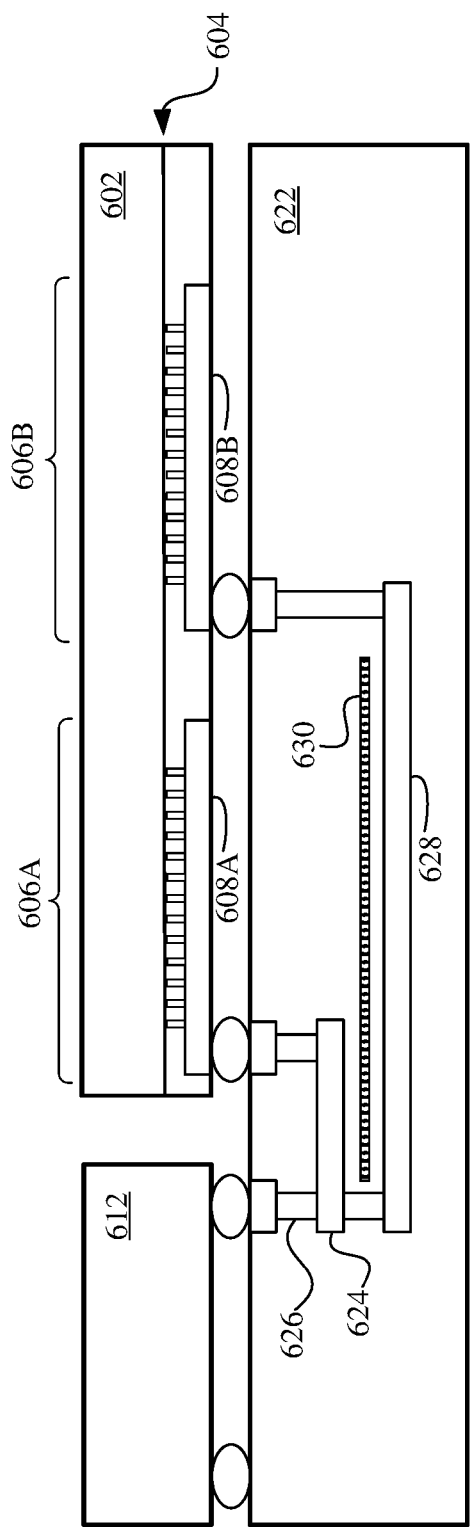

Referring to FIGS. 6A and 6B, some implementations of multi-drive modulators that use multiple electrode layers within a device for portions of the transmission lines delivering the drive signals. This multi-layer implementation may be useful, for example, for reducing RF crosstalk between the drive signal electrodes. FIG. 6A shows an example (in a side view) of a modulator 600 that includes a photonic integrated circuit (PIC) 602 with a waveguide layer 604 for the MZI sections 606A and 606B with p-n junction pairs (e.g., one p-n junction of each pair occurring within a ridge waveguide on one arm of the MZI, and another p-n junction of each pair occurring within a ridge waveguide on another arm of the MZI). There are a first series of conductive (e.g., metal) vias that connect ends of the p-n junctions between respective electrode strips of a first CPS electrode 608A, and a second series of conductive vias that connect ends of the p-n junctions between respective electrode strips of a second CPS electrode 608B. The CPS electrodes 608A and 608B are on a bottom surface of the PIC 602. The PIC 602 is connected in a "flip-chip" configuration (i.e., a controlled collapse chip connection) with conductive bumps between the PIC 602 and a substrate 610 (e.g., a ceramic substrate, or an organic high density build up (HDBU) substrate, or substrate of any other suitable materials). A driver chip 612 is also connected in a flip-chip configuration to the substrate 610. A differential drive signal from output ports of the driver chip 612 is coupled to the CPS electrode 608A over a first portion of an electrode extension structure comprising a low-loss CPS electrode 614 within a layer of the substrate 610, which is connected to the top surface of the substrate 610 through conductive vias 616. Another copy of the differential drive signal continues to propagate further down the CPS electrode 614 to the CPS electrode 608B. An RF shield 618 in another layer of the substrate 610 is used for isolation to reduce crosstalk between the CPS electrode 614 and the CPS electrode 608A.

FIG. 6B shows an example (in a side view) of a modulator 620 that includes the PIC 602 and the driver chip 612 with a different implementation of an electrode extension structure in a substrate 622. The differential drive signal is coupled to the CPS electrode 608A over a first portion of an electrode extension structure comprising a low-loss CPS electrode 624 within a first layer of the substrate, which is connected to the top surface of the substrate 622 through conductive vias 626. Another copy of the differential drive signal propagates to the CPS electrode 608B over another portion of the electrode extension structure comprising a low-loss CPS electrode 628 that is within a lower layer of the substrate 622 than the CPS electrode 624. In this and other implementations, different layers of the substrate 622 can include metal that is patterned to make a CPS electrode that can propagate the drive signal from the driver chip 612 through those layers and up vias to the different sections of the modulator. For example, metal vias can be connected between chips using solder bumps of a flip-chip configuration. In this example, an RF shield 630 is included to isolate the CPS electrodes 624 and 628 from one another and to isolate the CPS electrode 628 from the CPS electrode 608A. In both examples of FIGS. 6A and 6B, the drive signals driving the two halves of the modulator originate from a common split point that is connected to a same driver output.

Figure 7A:
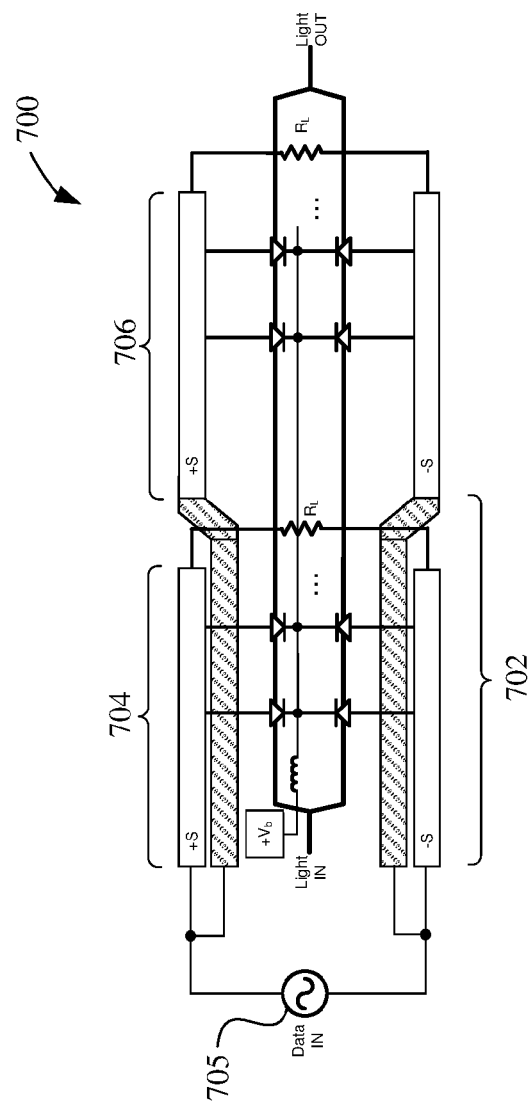
FIGS. 7A and 7B are schematic diagrams of example modulators.

FIG. 7A shows another example (in a top view) of a multi-drive modulator 700 with transmission lines that include multiple layers of electrode strips. An electrode extension structure shown in a hatched pattern includes a first section of a CPS electrode 702 extending in a layer under a layer that includes a p-n junction loaded CPS electrode 704 driving the first half of the modulator from a driver 705. A second section of a p-n junction loaded CPS electrode 706 driving the second half of the modulator from the driver 705 is in the same layer as the CPS electrode 704.

Figure 8:
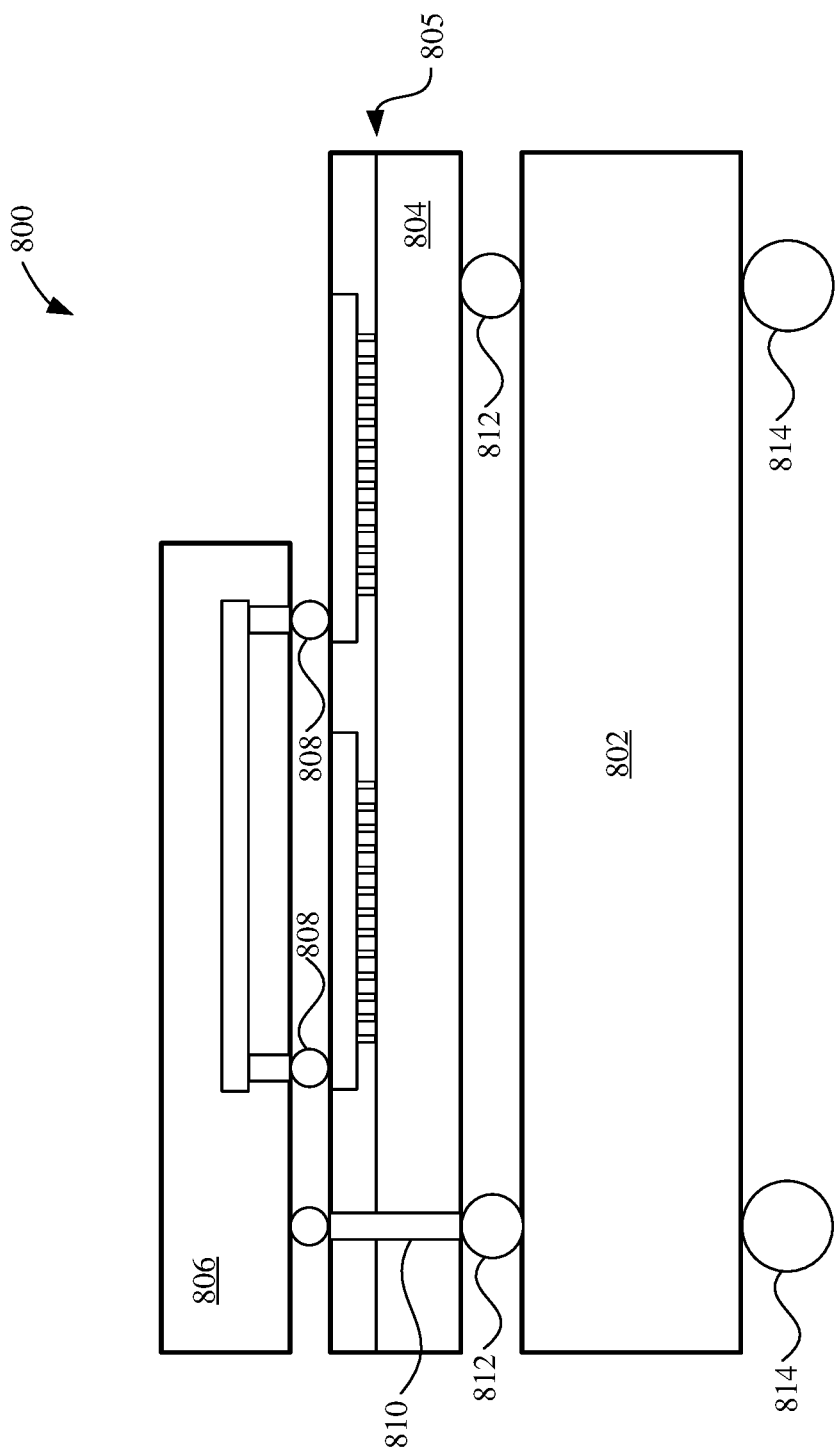
FIG. 8 is a schematic diagram of an example modulator.

Other configurations of a multi-drive modulator are also possible, such as the example in FIG. 8 in which a modulator 800 includes a substrate 802, a PIC 804 with a waveguide layer 805, and a driver chip 806 connected in a flip-chip configuration directly on top of the PIC 804. For example, copper pillars 808 can be used for the flip-chip connection to provide copies of the same drive signal to transmission lines in the PIC 804, and one or more through silicon vias 810 through the PIC 804 can be used to connect the driver chip 806 to the substrate 802, with solder bumps 812 between the PIC 804 and the substrate 802 and a ball grid array (BGA) 814 under the substrate 802.

Figure 7B:
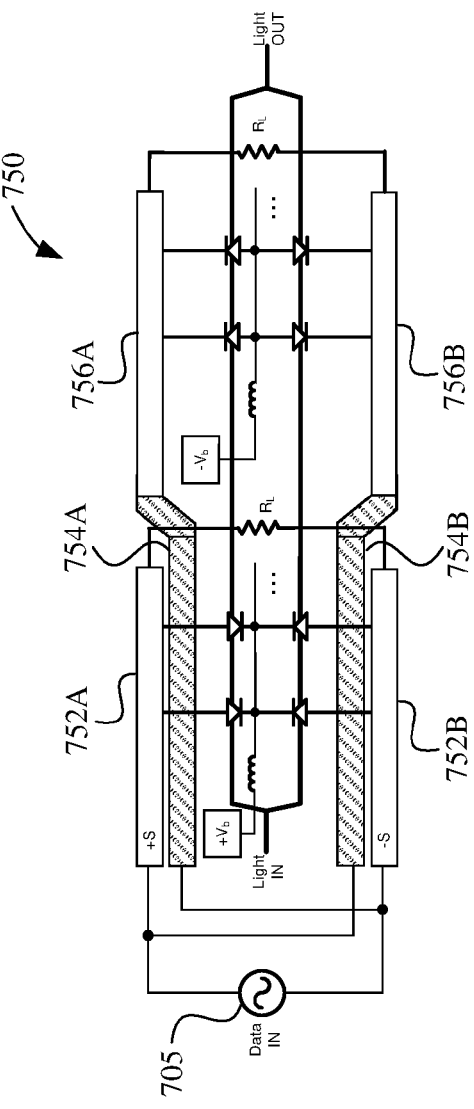

Different implementations can use different connection schemes to connect a driver's differential output to the two CPS electrode strips, to help improve for instance the RF imbalance of the MZM modulator. If the phase modulation efficiency in the two arms of the MZI is not the same (e.g., at DC or RF), which may occur due to fabrication imperfections such as mask misalignment for example, the orientation of the p-n junctions in the second half of the modulator can be reversed (along with the sign of the bias voltage used for the second half of the modulator), which calls for the driver S and $\overline{S}$ output signals to be routed differently to the first and second CPS electrode strips, as for the modulator 750 shown in FIG. 7B. The S signal of the differential output is sent to a loaded electrode strip 752A, a lower-layer unloaded electrode extension strip 754B, and a loaded electrode strip 756B. The $\overline{S}$ signal of the differential output is sent to a loaded electrode strip 752B, a lower-layer unloaded electrode extension strip 754A, and a loaded electrode strip 756A. Electrode strips 752A and 752B form a CPS electrode, electrode strips 754A and 754B form a CPS electrode, and electrode strips 756A and 756B form a CPS electrode.

The techniques described herein can be combined with a variety of different schemes for fabricating and operating a TW-MZM. For example, some of the schemes discussed in U.S. Pat. No. 10,823,988, incorporated herein by reference, are applicable to the modulator implementations described herein.

Figure 9C:
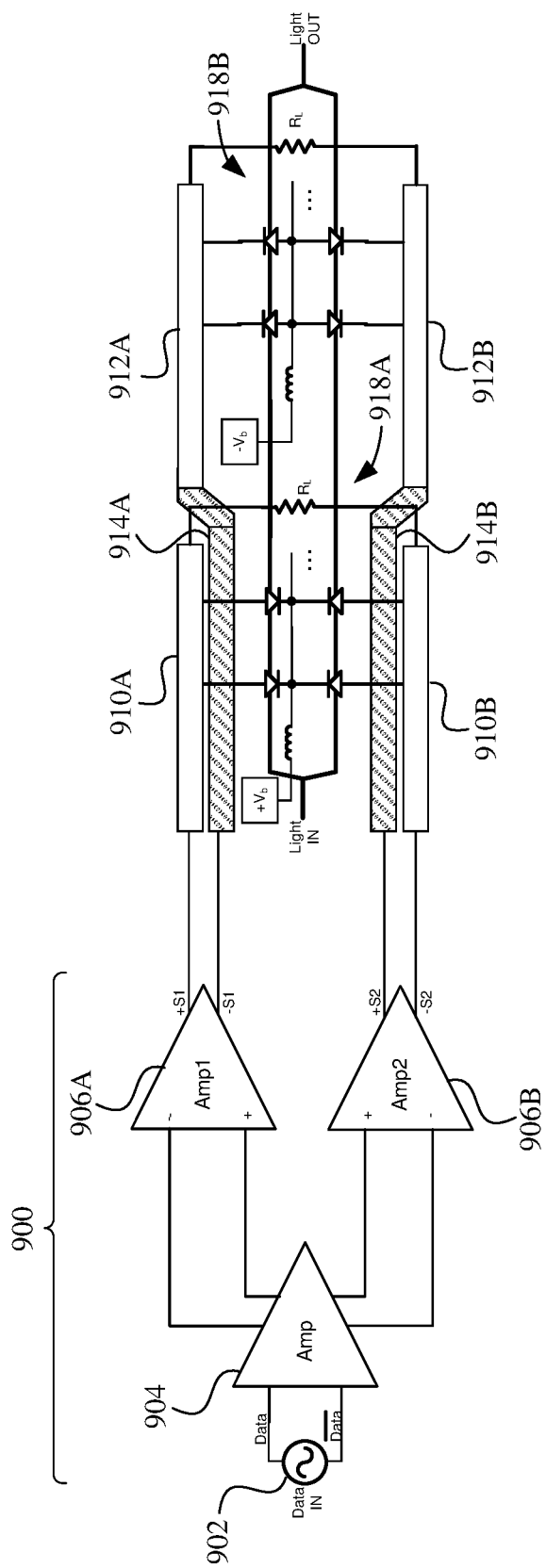

In some implementations, instead of driver that provides a single pair of differential output signals, a driver that provides multiple pairs of differential output signals can be used. For example, FIGS. 9A-9C show three different example configurations of driver circuits connected to modulators. Referring to FIG. 9A, driver circuitry 900 includes a data modulator 902 that provides a data signal and a complement data signal modulated based on an input data stream, a first stage amplifier 904 that provides two sets of preamplification signals, and second stage amplifiers 906A and 906B provide respective sets of differential drive signals labeled +S1 and -S1 for a first differential signal pair and +S2 and -S2 for a second differential signal pair. In some implementations, the second pair is essentially a copy of the first pair (i.e., S1 approximately equal to S2). In some implementations (e.g., the implementations of FIGS. 9A and 9B), the ratio of S1/S2 can be different from 1 (e.g., a ratio of 2) to achieve different signal strength for the first and second modulator sections. For example, in FIGS. 9A and 9B, amplifier 906B could be providing more gain than amplifier 906A to compensate for the loss of RF drive signal incurred by propagating over the unloaded CPS electrode 914A and 914B. In some implementations, the amplifier 906B is configured to have greater high frequency gain (e.g., high frequency peaking or emphasis), so that the combination of the first and second sections have a lower loss and/or flatter response.

FIG. 9A shows a case of MZI modulator sections 908A and 908B with p-n junction pairs (in a p-n-n-p series connection) connected to both pairs of loaded CPS electrode strips 910A and 910B, and 912A and 912B on the top layer. Wires from the amplifier 906A provide the ±S1 drive signals, which are connected to the CPS electrode strips 910A and 910B for the MZI section 908A of the first half of the modulator. Wires from the amplifier 906B provide the ±S2 drive signals, which are connected to a pair of unloaded CPS electrode strips 914A and 914B on a bottom layer connected to the loaded CPS electrode strips 912A and 912B. In this implementation, the wires from the two amplifiers 906A and 906B do not cross since they are routed to CPS electrode strips on different layers. FIG. 9B shows an alternative implementation of the driver circuitry 900 wired differently to MZI modulator sections 918A and 918B in which RF imbalance is compensated, using flipped p-n junction pairs in the second half of the modulator. In this implementation, the wires providing the ±S2 drive signals do cross each other, but the crossing can be implemented in a way that mitigates associated RF losses.

For example, at the crossing point, the capacitance and inductance of the two crossing lines can be controlled by its transmission line geometry and the stack-up (i.e., buildup of various metallization and dielectric layers). In some implementations of the RF crossing section, the geometries can be configured in such a way that the equivalent capacitance and inductance ratio and product is comparable to the original (un-crossed) transmission lines so that the resulting characteristic impedance and propagation speeds remain as close as possible to the uncrossed transmission lines resulting in near identical loss. For example, characteristic impedance can be expressed as:

$$Z_e \propto \sqrt{\frac{L_e}{C_e}}$$

For high frequency signaling, and high bit-rates, it may be useful to keep the same propagation velocity in the crossing as that for the uncrossed signals to maintain a broadband phase matching. The electrical velocity along the electrical RF line can be determined by the total capacitance and the equivalent inductance of the transmission line per unit length, as in the following expression for the electrical propagation speed:

$$v_e \propto 1/\sqrt{L_e C_e}$$

FIG. 9C shows another alternative implementation of the driver circuitry 900 wired differently to drive MZI modulator sections 918A and 918B in which the connections of the differential outputs of the driver circuitry 900 are reconfigured to avoid a crossing of the wires connecting the drive signal lines to the CPS electrode strips. Here, the first half of the modulator is driven by mixed output signals +S1 and -S2 from the amplifiers 906A and 906B, respectively, and similarly the second half of the modulator is driven by mixed outputs -S1 and +S2 from the amplifiers 906A and 906B, respectively.

In some implementations, each section can have a different length. For example, the MZI modulator sections in the second half of the various modulator implementations may be slightly longer (e.g., 5% or 10% longer) with correspondingly more p-n junction pairs to compensate for various factors (e.g., some loss associated with the unloaded electrode extension structure). In some implementations, there are more than two sections. The input impedance seen by the driver may be reduced by approximately 1/N where N is the number of sections, which means the driver may need to provide a larger voltage amplitude and thus more power. In some implementations, a relatively small value of N (e.g., 2 or 3) may provide an acceptable trade-off to achieve a greater bandwidth, but a larger value of N (e.g., 4 or more) may not provide enough of a bandwidth advantage to be worth the impedance reduction and/or the additional complexity of needing to route drive signal wires among a larger number of sections of the modulator.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
  an integrated circuit comprising
    an optical waveguide structure forming a Mach-Zehnder interferometer that includes a first optical waveguide arm and a second optical waveguide arm,
    a first electrical input port configured to receive a first drive signal,
    a second electrical input port configured to receive a second drive signal,
    a first transmission line comprising a first pair of electrodes on a first electrode layer configured to receive an electrical drive comprising the first drive signal and the second drive signal, where the first pair of electrodes are loaded by a first series of p-n junctions configured to apply optical phase modulation to respective optical waves propagating over a first section of the first and second optical waveguide arms, and a second transmission line comprising a second pair of electrodes on the first electrode layer configured to receive the electrical drive after an electrical signal delay, where the second pair of electrodes are loaded by a second series of p-n junctions configured to apply optical phase modulation to the respective optical waves propagating over a second section of the first and second optical waveguide arms after propagation over the first section of the first and second optical waveguide arms;

an electrode extension structure configured to provide the electrical drive to the second pair of electrodes, where the electrode extension structure includes a transmission line portion that is in one or more layers above or below the first electrode layer; and a radio-frequency (RF) shield disposed between at least a portion of the electrode extension structure and the first electrode layer, and configured to isolate at least a portion of the first transmission line from at least a portion of the second transmission line.

2. The apparatus of claim 1, further comprising a first junction among three wires that include a first wire connected to the first electrical input port, a second wire connected to a first electrode of the first pair of electrodes, and a third wire connected to a first electrode of the electrode extension structure, and a second junction among three wires that include a fourth wire connected to the second electrical input port, a fifth wire connected to a second electrode of the first pair of electrodes, and a third wire connected to a second electrode of the electrode extension structure.

3. The apparatus of claim 1, wherein the first series of p-n junctions and the second series of p-n junctions are of substantially equal lengths.

4. The apparatus of claim 1, wherein the transmission line portion is in a layer of the integrated circuit different from the first electrode layer.

5. The apparatus of claim 1, wherein the transmission line portion is in a layer of a device that is coupled to the integrated circuit by a controlled collapse chip connection.

6. The apparatus of claim 1, wherein the integrated circuit includes driver circuitry configured to provide the first and second drive signals.

7. The apparatus of claim 6, wherein the driver circuitry includes a first amplifier circuit that provides the first drive signal to the first pair of electrodes of the first transmission lines, and a second amplifier circuit that provides the second drive signal to the second pair of electrodes of the second transmission lines.

8. The apparatus of claim 6, wherein the circuitry comprises a differential electrical drive where the second drive signal has a negative amplitude relative to the first drive signal, and the optical phase modulation comprises a differential optical phase modulation between the first and second optical waveguide arms.

9. The apparatus of claim 1, wherein the integrated circuit is a first integrated circuit, and the first integrated circuit is coupled to a second integrated circuit that includes driver circuitry configured to provide the first and second drive signals.

10. The apparatus of claim 9, wherein the driver circuitry comprises signal splitting circuitry coupled to a differential signal output port of an electrical circuit.

11. The apparatus of claim 9, wherein the driver circuitry comprises transistor-level circuitry within an electrical circuit that includes two pairs of differential signal output ports.

\* \* \* \* \*